Feb. 4, 1941.  J. A. SCHOFIELD  2,230,517
AUXILIARY HEAD LAMP
Filed Aug. 14, 1939
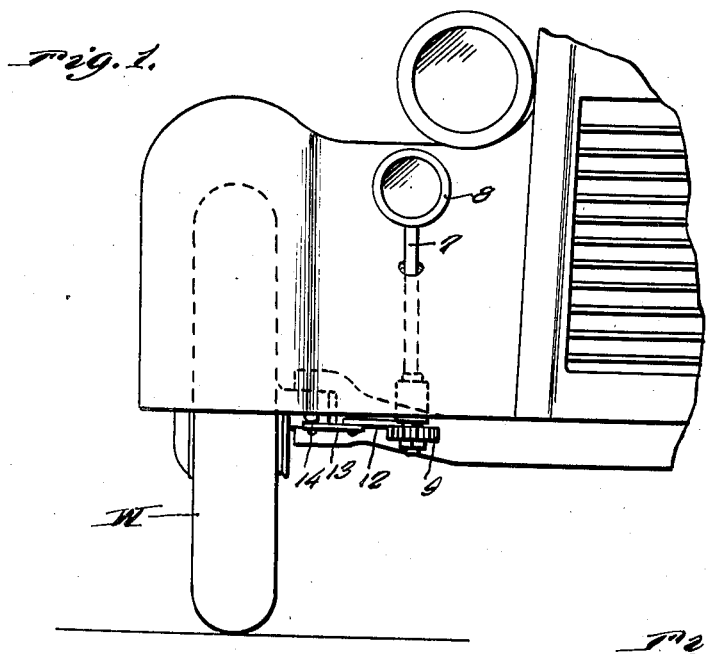
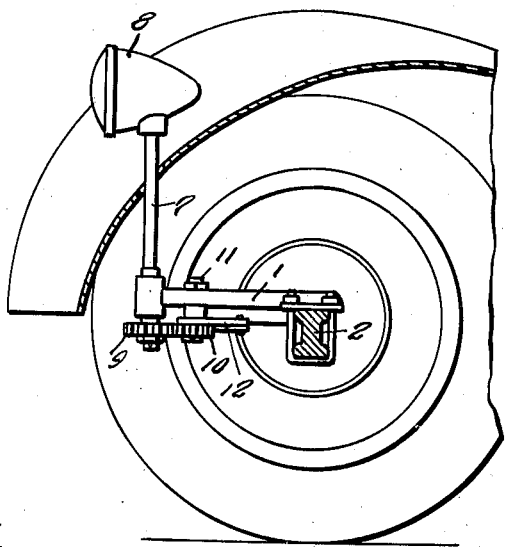
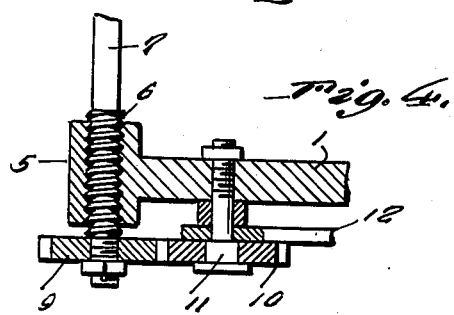
Inventor
J. A. Schofield
By Clarence A. O'Brien
and Hyman Berman
Attorneys Patented Feb. 4, 1941

2,230,517

UNITED STATES PATENT OFFICE 2,230,517

AUXILIARY HEAD LAMP

James A. Schofield, Lynbrook, N. Y.

Application August 14, 1939, Serial No. 290,063

1 Claim. (Cl. 240—62.61)

This invention relates to an auxiliary head lamp for automobiles, the general object of the invention being to provide a lamp arranged at the right of the automobile and movable with the right hand front wheel so that the lamp will light the near side of the road and will illuminate said side as the car takes a turn or curve as the lamp is connected with the steering knuckle of the right front wheel.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a fragmentary front view of an automobile provided with the improved lamp.

Figure 2 is a vertical sectional view through Figure 1 and showing the improved lamp and associated parts in elevation.

Figure 3 is a plan view of the supporting and operating means for the lamp with the lamp omitted and the parts attached to the front axle.

Figure 4 is a section on the line 4—4 of Figure 3.

In this drawing the numeral 1 indicates a forwardly extending supporting bar which is connected by the U-clamps 2 to the front axle 3 of the automobile adjacent the right hand end thereof and said bar at its front end is provided with a vertically arranged tubular part 5 which is internally screw threaded to receive the screw-threaded part 6 of a lamp standard 7 which has the lamp casing 8 connected to its upper end. A gear 9 is connected to the lower end of the shaft 7 and meshes with a gear 10 on a stub shaft 11 depending from the bar 1 and said gear 10 has an arm 12 fastened thereto which extends toward the front wheel and has pivoted to its outer end an arm or link 13 which, in turn, is pivoted to a forwardly extending arm 14 attached to the steering knuckle 15 of the right front wheel W. Thus it will be seen that as the front wheel W turns to take a curve in the road the arm 4 will follow this movement and this movement of the arm 14 will be communicated to the arms 13 and 12, arm 12 turning the gear 10 which in turn turns the gear 9 and thus the lamp standard 7 is turned so as to cause the lamp 8 to turn in the same direction as the wheel is being turned for steering purposes. Thus the lamp will illuminate the near side of the road on curves so that the driver can readily see the edge of the road as he is making a turn. By using gears 10 and 9 of the proper ratio the amount of movement of the lamp 8 relative to the steering movement of wheel W can be adjusted.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

In a motor vehicle including its front axle and a front wheel supporting knuckle, a forwardly extending bar fastened to the axle adjacent the knuckle, said bar having a vertically arranged tubular part at its front end which is internally screw-threaded, a lamp standard having a threaded part at its lower end turned into said tubular part, to prevent said standard from vibrating vertically a gear fastened to the lower end of the standard below the threaded part, a depending stub shaft carried by the bar adjacent its forward end, a second gear rotatably arranged on the stub shaft and meshing with the first gear, an arm fastened to the second gear and extending outwardly and rearwardly toward the knuckle, a forwardly extending bar connected with the knuckle and a link having one end pivoted to the front end of said last-mentioned bar and its other end pivoted to the rear end of the arm whereby movement of the knuckle in a steering movement will be communicated to the lamp standard and a lamp at the upper end of the standard.

JAMES A. SCHOFIELD.